United States Patent
Tran et al.

(10) Patent No.: US 9,524,162 B2
(45) Date of Patent: Dec. 20, 2016

(54) APPARATUS AND METHOD FOR MEMORY COPY AT A PROCESSOR

(75) Inventors: Thang M. Tran, Austin, TX (US); James Yang, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 822 days.

(21) Appl. No.: 13/455,800

(22) Filed: Apr. 25, 2012

(65) Prior Publication Data

US 2013/0290639 A1 Oct. 31, 2013

(51) Int. Cl.
| | |
|---|---|
| G06F 12/00 | (2006.01) |
| G06F 9/30 | (2006.01) |
| G06F 12/08 | (2016.01) |
| G06F 9/38 | (2006.01) |

(52) U.S. Cl.
CPC ....... *G06F 9/30032* (2013.01); *G06F 9/30043* (2013.01); *G06F 9/384* (2013.01); *G06F 9/3838* (2013.01); *G06F 12/0897* (2013.01)

(58) Field of Classification Search
CPC .................................. G06F 12/0888–12/0897
USPC .......................................................... 711/125
See application file for complete search history.

(56) References Cited

U.S. PATENT DOCUMENTS

| | | | |
|---|---|---|---|
| 2003/0061467 A1* | 3/2003 | Yeh et al. ...................... 712/217 |
| 2005/0138338 A1* | 6/2005 | Sodani et al. ................. 712/225 |
| 2006/0123184 A1* | 6/2006 | Mondal et al. .................... 711/6 |
| 2009/0037697 A1* | 2/2009 | Ramani et al. ............... 712/214 |
| 2009/0100253 A1* | 4/2009 | Moyer .......................... 712/223 |
| 2011/0153983 A1* | 6/2011 | Hughes et al. ................. 712/22 |
| 2012/0137074 A1* | 5/2012 | Kim ...................... G06F 9/3004 |
| | | | 711/122 |

OTHER PUBLICATIONS

De Langen, P. et al., "Memory Copies in Multi-Level Memory Systems," IEEE International Conference on Application-Specific Systems, Architectures and Processors, Jul. 2-4, 2008; pp. 281-286.
Duarte, F. et al., "A memcpy Hardware Accelerator Solution for Non Cache-line Aligned Copies," IEEE International Conference on Application-Specific Systems, Architectures and Processors; Jul. 9-11, 2007, pp. 397-402.
Vassiliadis, S. et al., "A Load/Store Unit for a memcpy Hardware Accelerator," IEEE International Conference on Field Programmable Logic and Applications, Aug. 27-29, 2007, pp. 537-541.
Wong, S. et al., "A Hardware Cache memcpy Accelerator," IEEE International Conference in Field Programmable Technology, Dec. 2006, pp. 141-147.

* cited by examiner

*Primary Examiner* — Prasith Thammavong

(57) ABSTRACT

A processor uses a dedicated buffer to reduce the amount of time needed to execute memory copy operations. For each load instruction associated with the memory copy operation, the processor copies the load data from memory to the dedicated buffer. For each store operation associated with the memory copy operation, the processor retrieves the store data from the dedicated buffer and transfers it to memory. The dedicated buffer is separate from a register file and caches of the processor, so that each load operation associated with a memory copy operation does not have to wait for data to be loaded from memory to the register file. Similarly, each store operation associated with a memory copy operation does not have to wait for data to be transferred from the register file to memory.

20 Claims, 4 Drawing Sheets

APPARATUS AND METHOD FOR MEMORY COPY AT A PROCESSOR

FIELD OF THE DISCLOSURE

The present disclosure relates generally to processors and more particularly relates to memory of a processor.

BACKGROUND

A processor typically interacts with a memory subsystem to store and retrieve data. For some applications, it can be useful to copy data stored at one block of memory (the source block) to another block (the destination block). Processors typically do not include special instructions for memory copy operations, whereby in response to a memory copy operation request the processor executes a set of load and store instructions to copy data from one block to another. Each load instruction of the memory copy operation loads a portion of the source block into a register, and each store instruction of the memory copy operation stores the data at the register to the destination block. When the data to be copied is not present at a low-level data cache, the load and store operations are time consuming and inefficient.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

A processor uses a dedicated buffer to reduce the amount of time needed to execute memory copy operations. For each load and store instruction, the processor determines whether the instruction is associated with a memory copy operation. For each load instruction associated with the memory copy operation, the processor copies the load data from memory to the dedicated buffer. For each store operation associated with the memory copy operation, the processor retrieves the store data from the dedicated buffer and transfers it to memory. The dedicated buffer is separate from a register file and caches of the processor, so that each load operation associated with a memory copy operation does not have to wait for data to be loaded from memory to the register file. Similarly, each store operation associated with a memory copy operation does not have to wait for data to be transferred from the register file to memory.

As used herein, a memory copy operation is an operation wherein a block of memory having multiple addressable memory locations is copied to another block of memory having multiple addressable memory locations. A load operation is associated with the memory copy operation if it is one of the instructions generated to effectuate the memory copy operation. Similarly, a store operation is associated with the memory copy operation if it is one of the instructions generated to effectuate the memory copy operation.

In one embodiment, to determine whether a load or store operation is associated with a memory copy operation the processor employs a scoreboard that 1) maps architectural registers of the processor's instruction set to physical registers at the register file; and 2) keeps track of whether an architectural register is a destination operand for a particular instruction. Based on the scoreboard, the processor can detect a memory copy operation as follows: a load to an architectural register RA followed by a store from architectural register RA, with no other instruction using the architectural register RA as a source operand. These and other embodiments can be better understood with reference to FIGS. 1-5.

Figure 1:
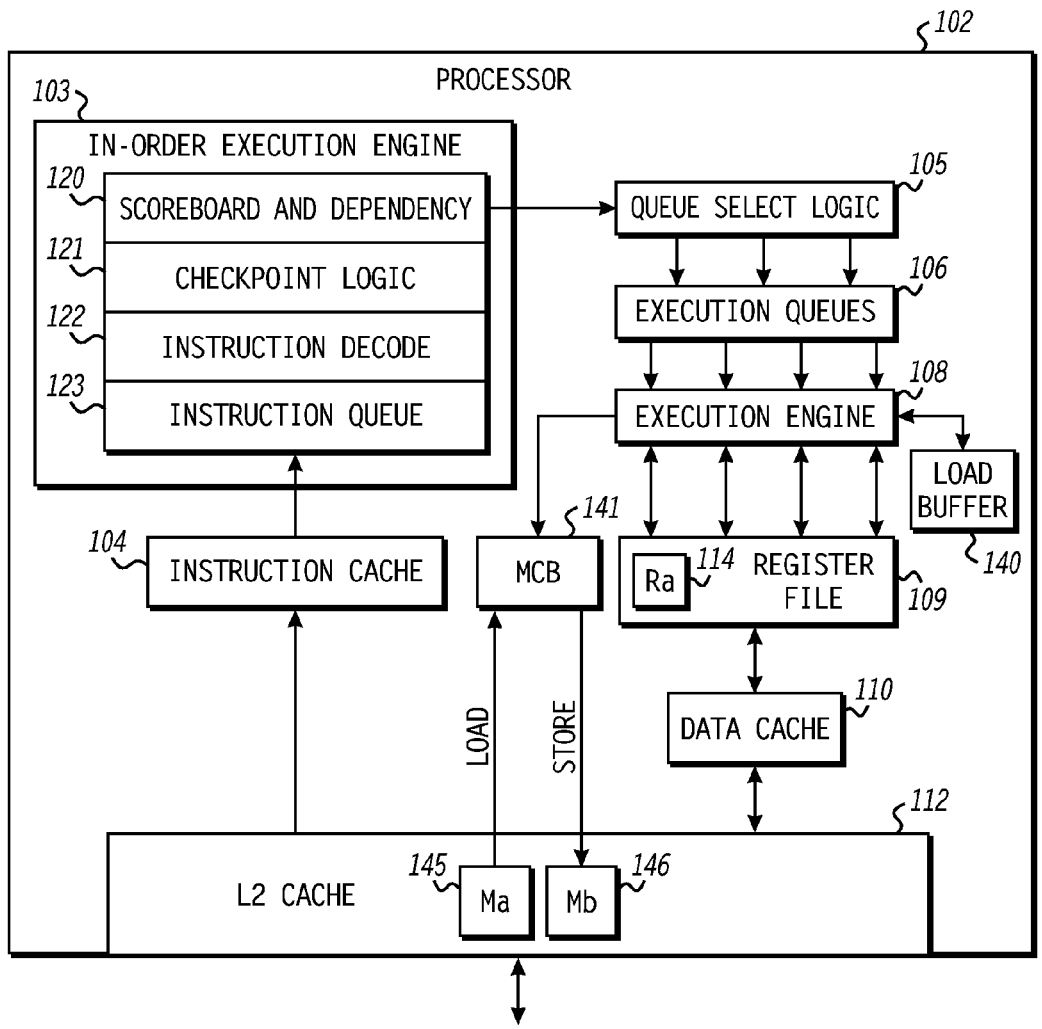
FIG. 1 is a block diagram illustrating a processor in accordance with one embodiment of the present disclosure.

FIG. 1 illustrates a processor 102 in accordance with one embodiment of the present disclosure. In the illustrated example, the processor 102 includes an instruction cache 104, and an instruction pipeline including an in-order execution engine 103, queue selection logic 105, execution queues 106, execution engine 108, a register file 109, a level 1 (L1) data cache 110, and a level 2 (L2) cache 112. The in-order execution engine includes a scoreboard and dependency logic 120, a checkpoint logic 121, an instruction decode 122, and an instruction queue 123.

The instruction cache 104 stores undecoded instructions designated for execution at the processor 102. The in-order execution engine 103 is generally configured to retrieve undecoded instructions from the instruction cache 104 and prepare the undecoded instructions for execution. Each undecoded instruction represents an opcode, defining the instruction is designated to perform, and also can represent operands indicating the data associated with the instruction. For example, some instructions include a pair of source operands (designated Source 0 and Source 1) indicating the source of data upon which the instruction is performed, and a destination operand, indicating the location where the result of the instruction is to be stored.

The instruction queue 123 is configured to retrieve and store undecoded instructions based a program flow designated by a program or program thread. The instruction decode 122 is configured to decode each undecoded instruction. In particular, the instruction decode determines the control signaling required for subsequent processing stages to effect the instruction indicated by an instructions opcode. For convenience herein, a decoded instruction is referred to as either a decoded instruction or simply "an instruction."

The checkpoint logic 121 is configured to determine the architectural registers associated with the operands of each instruction. In an embodiment, the architectural registers are identified based on the instruction set implemented by the processor 102. As described further herein, the register file 109 includes a set of physical registers, whereby each physical register can be mapped to one of the architectural registers. Further, the particular physical register that is mapped to an architectural register can change over time. The architectural registers thus provide a layer of abstraction for the programmers that develops the programs to be executed at the processor 102. Further, the dynamic mapping of physical registers to architectural registers allows the processor 102 to implement certain features such as branch prediction.

For every load and store instruction, the in-order execution engine assigned an entry from the load buffer 140 or store buffer (not shown). Load and store instructions are executed out-of-order but the references to memory must be preserved the order of execution based on memory addresses. The load buffer entry number is also used to track the load instruction through out-of-order execution engine.

The scoreboard and dependency logic 120 is configured to perform at least three tasks for each instruction: 1) determine whether the instruction is dependent on another instruction; 2) to record, at a module referred to as a scoreboard, the mapping of the architectural registers to the physical registers; and 3) store information indicating whether an architectural register has been designated for use by load and store instructions associated with a memory copy operation. Thus, in response to receiving an instruction, the scoreboard and dependency logic 120 determines whether the instruction is a dependent instruction. The execution engines 108 are generally configured such that they can execute instructions out-of-order. However, the processor 102 ensures that dependent instructions are executed in-order, so that execution of the dependent instruction does not cause unexpected results relative to the flow of the executing program or program thread.

The scoreboard and dependency logic 120 also determines whether an architectural register is subject to the following conditions: 1) the architectural register is used as the destination for a load instruction; 2) the architectural register is used as the source data of a store instruction; and 3) the architectural register is not used as a source operand for an instruction other than a source data operand of the store instruction. If the architectural register is subject to these conditions, the scoreboard and dependency logic 120 indicates that the register has been designated for use in a memory copy operation. As described further herein, the processor 102 uses this indication to alter the normal execution of the load and store instructions associated with the architectural register.

The scoreboard and dependency logic 120 provides instructions to the queue selection logic 105. The queue selection logic 105 determines, for each instruction, which execution queue of the execution engines 108 to store the instruction. The selected queue can be determined based on the dependency of the instruction, if any, and the instruction type. In particular, dependent instructions can be stored at the execution queue that stores the independent instructions from which they depend.

The execution engine 108 includes a set of execution units to execute instructions stored at the execution queues 106. One or more arbiters of the execution engine 108 select instructions to be executed from the execution queues 106 according to a defined arbitration scheme, such as a round-robin scheme. For each of the execution queues 106, the instructions stored at the queue are executed in order, according to a first in, first out scheme. This ensures that dependent instructions are executed in order.

Register file 109 includes a set of physical registers that store the operands for executing instructions. In particular, the operands of an instruction can identify a destination register, indicating where data resulting from the instruction is to be stored, and one or more source registers, indicating where data required to perform the instruction is stored. An instruction identifies the operands as architectural registers.

Data cache 110 and L2 cache 112 are portions of the memory hierarchy of the processor 102. The memory hierarchy can include additional caches (not shown), system memory (not shown) and the like. The memory hierarchy is arranged in a hierarchical fashion whereby a lower level in the hierarchy typically stores a subset of the data stored at the next higher level in the hierarchy. Thus, in the illustrated embodiment, data cache 110 is the lowest level of the memory hierarchy and stores a subset of the data stored at the next higher level in the memory hierarchy, the L2 cache 112.

In response to a load instruction, the processor can transfer data from the lowest level of the memory hierarchy to the register file 109. Transferring data from a particular level in the memory hierarchy to the register file 109 typically requires that the load data be transferred to each lower level in the memory hierarchy, and then transferred from the data cache 110 to the load instruction's destination register. Further, storing data from a register of the register file 109 to a level of the memory hierarchy higher than data cache 110 can take a significant amount of time relative to other processor operations. Because a memory copy operation involves a series of load and store instructions, a memory copy operation in a high level of the memory hierarchy, such as L2 cache 112, can undesirably reduce the efficiency of the processor 102. Accordingly, for a memory copy operation the processor 102 uses a memory copy buffer (MCB) 141 to effectuate the transfer.

To illustrate, for each load instruction that is determined to be associated with a memory copy operation from memory address block 145 to memory address block 146 of L2 cache 112, if the load instruction results in a hit at the L1 data cache 110, the load instruction is executed normally by loading the load data from the cache 110 to the instruction's destination register. If the load instruction misses at the data cache 110, the load instruction is pushed to the L2 cache 112. The load data at the L2 cache 112 (stored at block 145) is transferred to the MCB 141. In one embodiment, loading data from L1 data cache 110 takes 3 clock cycles while loading data from the L2 cache 112 takes 12-30 clock cycles. The memory-copy load operation is considered completed when an L1 data cache miss is detected. In one embodiment, the execution time of memory-copy load operation is drastically reduced by 12-30 clock cycles by loading data from the L2 cache to MCB 141 instead of loading the data to register file 109 and allowing the store operation to proceed.

For each store instruction associated with the memory copy operation, the execution engine 108 determines whether there is a hit at data cache 110. If so, the execution engine 108 invalidates the cache entry that resulted in the hit. In either the case of a cache hit or cache miss, the memory-copy store is executed by transferring the store data from the MCB 141 to memory address block 146 of L2 cache 112. Thus, load and store instructions associated with a memory copy operation are not executed using the register file 109, but instead are executed using the MCB 141. The load and store operations can therefore be completed more quickly, improving processor efficiency.

In one embodiment, the memory copy feature of the processor 102 can be enabled or disabled by software. In another embodiment, the memory copy feature can be enabled or disabled based on a state of the processor 102 as monitored by a hardware module (not shown). Further, the load and store instructions associated with a memory copy operation can be a select type of load and store instruction, such as single instruction, multiple data (SIMD) instructions that have a greater width than non-SIMD load and store instructions executed at the processor 102. In another embodiment, the use of the MCB 141 can be triggered by special load and store instructions that inform the processor the data being accessed will not be needed again soon.

Figure 2:
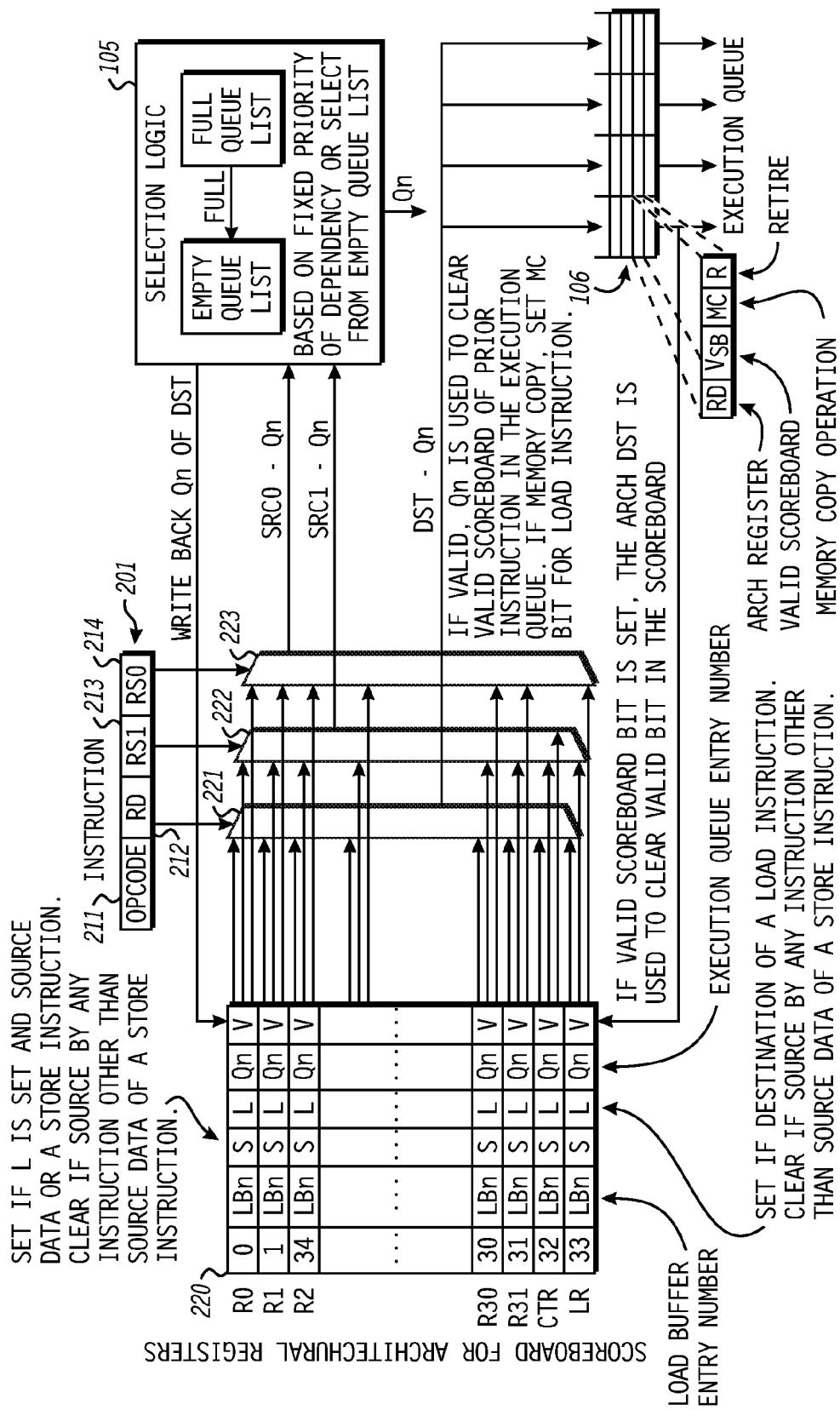
FIG. 2 is a block diagram illustrating portions of the processor of FIG. 1 in accordance with one embodiment of the present disclosure.

FIG. 2 illustrates an example of a scoreboard 220 employed as part of the scoreboard and dependency logic 120 of FIG. 1, an example of the queue select logic 105, and execution queues 106 in accordance with one embodiment of the present disclosure. The illustrated embodiment depicts an undecoded instruction 201 including an opcode field 211, a destination operand 212, and source operands 213 and 214. The operands 212-214 are expressed as architectural registers. The instruction 201 can be decoded at the instruction decode stage 122 (FIG. 1) into one or more instructions based on the opcode field 211.

After instruction 201 is decoded, a rename logic (not shown) selects an available physical register to rename the destination operand of the instruction. In the illustrated embodiment, each row of the scoreboard 220 is associated with a different architectural register. Each row of the scoreboard 220 includes a renamed physical register field, a load buffer entry number (LBn) field, a store bit (S), a load bit (L), an execution queue field (Qn), and a valid bit (V). The renamed physical register field indicates the physical register most recently assigned to the architectural register corresponding to the row. Thus, in the illustrated embodiment, physical register "34" was most recently assigned to architectural register R2. The queue number field ($Q_n$) stores an identifier indicating which of the execution queues 106 stores the corresponding most recently assigned instruction with a destination operand corresponding to the architectural register. For example, in the illustrated embodiment, the third row of the scoreboard 220 stores the value Qn for the queue entry in the execution queues 106 with R2 as the destination operand and renamed to physical register 34. As described further below, the queue number field is used to identify which execution queue is to store particular dependent instructions.

The valid bit (V) is used to store an indicator as to whether the corresponding most recently assigned instruction with a destination operand corresponding to the architectural register is still in the execution queue. To illustrate, when the corresponding most recently assigned instruction with a destination operand corresponding to the architectural register is decoded, the destination operand is renamed to an available physical register and written to the renamed physical register field and the valid bit is set for this architectural register. As the instruction is dispatched to a queue entry of execution queues 106, the execution queue entry is written into the queue number field of the scoreboard. As this entry in the execution queue is selected for execution, the valid bit field of the scoreboard will be reset.

The conditions for detecting a memory-copy operation are (1) first detecting a load instruction to a destination operand pointing to an architectural register, (2) followed by detecting a store instruction that use the same architectural register as a source operand for data to store to memory, and (3) the architectural register is not referenced by any other source operand of any instruction including as the memory-address source operand of the above store instruction. Based on the above conditions, the procedure for detecting a memory copy operation is described below. The load bit for an architectural register is set if the architectural register is the destination operand for a load instruction (decoded from opcode field 211). Because any load to an architectural register is a potential memory copy operation, a load bit in the scoreboard for the architectural register is set. The load bit for the architectural register is cleared if the architectural register is used as a source operand by any instruction other than as the source data operand of a store instruction. The store bit for an architectural register is set if 1) the load bit for the architectural register is set; and 2) the architectural register is used as a source data operand for a store instruction. The store bit for the architectural register is cleared if the architectural register is used as a source operand by any instruction other than a store instruction, or if it is used as a source address operand for a store instruction. Accordingly, if both the load bit and store bit for an architectural register are set, this indicates that the architectural register is associated with a memory copy operation. Thus, the load and store operations use the architectural register as a destination and source operand, respectively, when the load and store bits are set are determined to be associated with a memory copy operation. Furthermore, when the architectural register is re-used as destination operand of another instruction, then the memory copy operation is confirmed.

Each operand of every instruction in decode accesses the scoreboard 220 for dependency information and to update the scoreboard fields. A decoded instruction has 3 operands, 212, 213, and 214. Each operand corresponds to one of 3 read ports 221, 222, and 223 of the scoreboard. Read ports 221, 222 and 223 provide instruction dependency information to the queue selection logic 105, so that the instruction can be sent to an independent execution queue or a dependent execution queue. Read port 221 for destination operand 212 provides an indication of the current corresponding most recently assigned instruction with the destination operand corresponding to the architectural register. Since the decoded instruction will be the most recently assigned instruction with the destination operand corresponding to the architectural register, the "write-back" status of the current corresponding most recently assigned instruction with the destination operand corresponding to the architectural register must be reset as described below.

The execution queues 106 store instructions and associated control information. In the illustrated embodiment, the control information for each instruction includes the destination architectural register associated with the instruction, a valid scoreboard bit "$V_{SB}$", and a memory copy (MC) bit. The $V_{SB}$ bit indicates whether the corresponding instruction is the instruction whose execution will trigger the clearing of the valid bit at scoreboard 320 corresponding to the destination architectural register. The "$V_{SB}$" is set only for the most recently assigned instruction with the destination operand corresponding to the architectural register. When another instruction is decoded with the same destination operand (same architectural register), then "$V_{SB}$" for the previous instruction must be cleared. The Qn of the current corresponding most recently assigned instruction with the destination operand corresponding to the architectural register is used to go directly to the queue entry in execution queues 106 to clear the "$V_{SB}$" bit.

The MC bit indicates whether a load instruction is associated with a memory copy operation. Accordingly, the MC bit can only be set if the instruction is a load instruction. The MC bit is set when the L bit and S bit for the destination architectural register are both set. The MC bit is cleared when either the L bit or the S bit for the architectural register is cleared. The MC bit can also be stored at the corresponding entry of the load buffer 140 for the load instruction.

Figure 3:
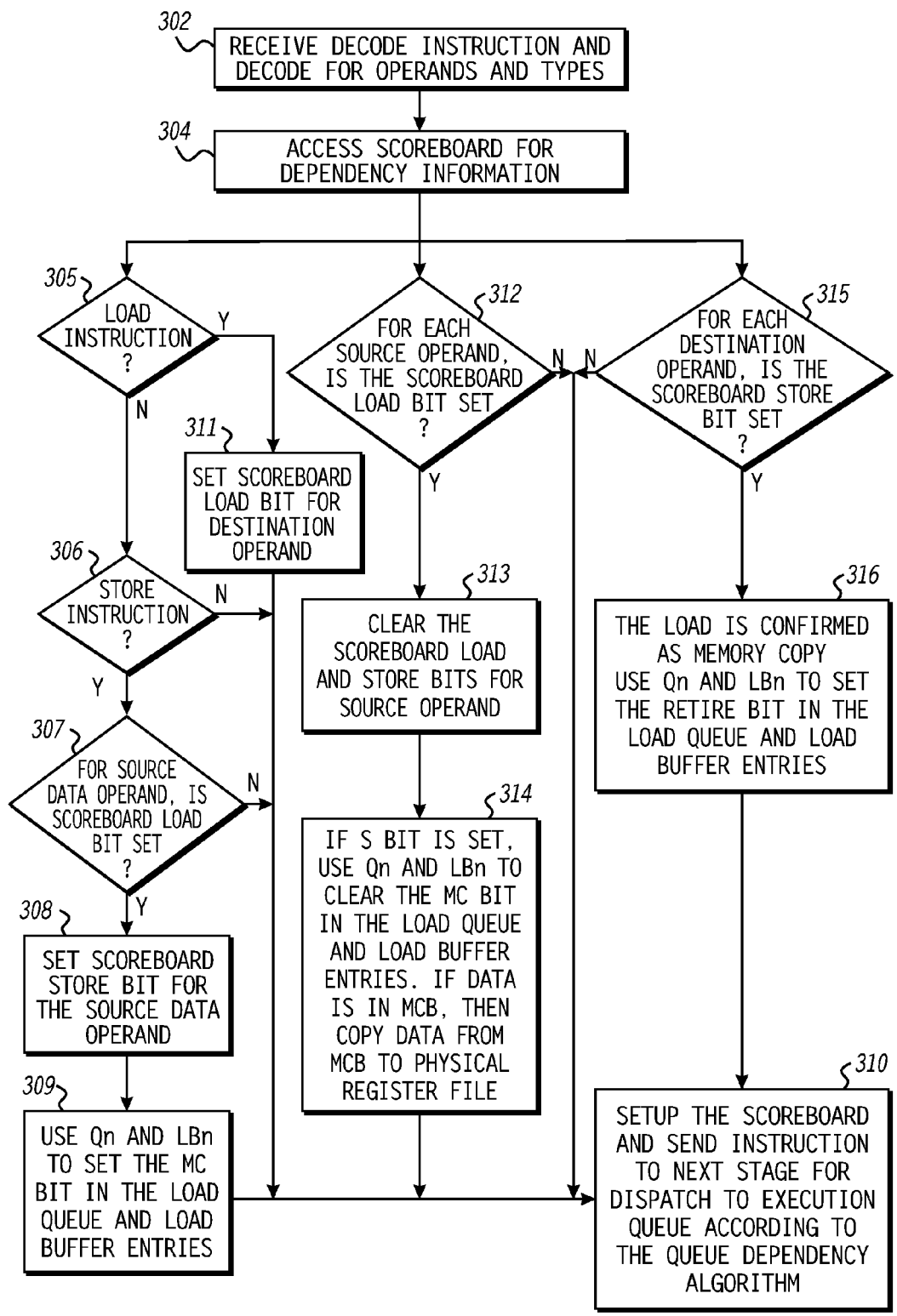
FIG. 3 is a flow diagram illustrating a method of determining whether an instruction is associated with a memory copy operation in accordance with one embodiment of the present disclosure.

The control of the information at the scoreboard 220 and the execution queues 106 can be better understood with reference to FIG. 3, which illustrates a method of determining whether an instruction is associated with a memory copy operation in accordance with one embodiment of the present disclosure that can be implemented in processor 102. At block 302, the scoreboard and dependency logic 120 receives decoded instruction information indicating the type of instruction and the instruction operands. At block 304 the processor 102 accesses the scoreboard 220 to determine dependency information for the instruction.

At block 305, the scoreboard and dependency logic 120 determines if the instruction is a load instruction. If so, the method proceeds to block 311 and the load bit is set for the architectural register corresponding to the instruction's destination operand and the method proceeds to block 310, described below. If the instruction is not a load instruction, the method flow moves from block 305 to block 306 and the processor 102 determines if the instruction is a store instruction. If not, the method flow moves to block 310, described below. If the instruction is a store instruction, the scoreboard and dependency logic 120 determines, at block 307, if the scoreboard entry is valid and the load bit is set for the source data operand of the store instruction. If not, the method flow moves to block 310. If the load bit is set for the source operand, the method flow moves to block 308 and the scoreboard and dependency logic 120 sets the store bit for the source operand's architectural register. The method flow moves to block 309 and the scoreboard and dependency logic 120 uses the Qn and LBn values of the source operand's architectural register to set the MC bit for the load instructions at the corresponding entries of the execution queues 106 and the load buffer 140. The method flow moves to block 310, described below.

At block 312, concurrent with determining if the instruction is a load instruction at block 305, the scoreboard and dependency logic 120 determines if the load bit is set for the architectural registers corresponding to the source operands. If not, the method flow moves to block 310. If the load bit is set for the source operands' architectural registers, the method flow moves to block 313 and the scoreboard and dependency logic 120 clears the load and store bits for the source operands' architectural registers. To illustrate the difference between the checks at blocks 306, 307, and 308, and blocks 312 and 313, at blocks 306, 307, and 308 the destination operand of load instruction and source data operand of store instructions are checked in order to detect a potential memory-copy operation. Note that the source data operand for the store instruction is stored at the Rd field of the store. The Rd field is often used as destination operand for other instructions. The dependency data is read through read port 221 of the scoreboard 220. At block 312 for all other source operands of any instruction (including load and store instructions) are checked. Thus, for example, at blocks 312 and 313 it is determined whether the source address operand of load and store instructions has the load bit set. If so, this indicates that the load or store instruction is not associated with a memory copy operation. Accordingly, the potential memory copy operation that may be indicated at blocks 306, 307, and 308 can be invalidated at blocks 312 and 313. The method flow proceeds to block 314 and, if the S bit for the source operands architectural registers was set at block 312, the scoreboard 220 uses the Qn and LBn values of the source operand's architectural register to set the MC bit for the load instructions at the corresponding entries of the execution queues 106 and the load buffer 140. Furthermore, if the load data is loaded to MCB 141, then load data must be copied from MCB 141 to register file according to the renamed destination register of the load instruction. The method flow moves to block 310, described below.

At block 315, concurrent with determining if the instruction is a load instruction at block 305, the scoreboard and dependency logic 120 determines if the store bit is set for the architectural register corresponding to the instruction's destination operand. If not, the method flow moves to block 310. If the store bit is set, the method flow moves to block 316 and any load operation associated with the destination architectural register is confirmed as a memory copy. Accordingly, the scoreboard 220 uses the Qn and LBn values of the source operand's architectural register to set a retire bit for the load instructions at the corresponding entries of the execution queues 106 and the load buffer 140. The method flow proceeds to block 310 where the scoreboard 220 is set up to ensure that physical registers are assigned to the operands of the instructions. The instruction is sent to the queue selection logic 105 for dispatch to a selected queue, according to a defined dependency hierarchy. When the load instruction is retired, if the retire bit in the load buffer is not set, then the load data in MCB 141 must be copied to the register file according to the renamed destination register of the load instruction.

Figures 4, 5:
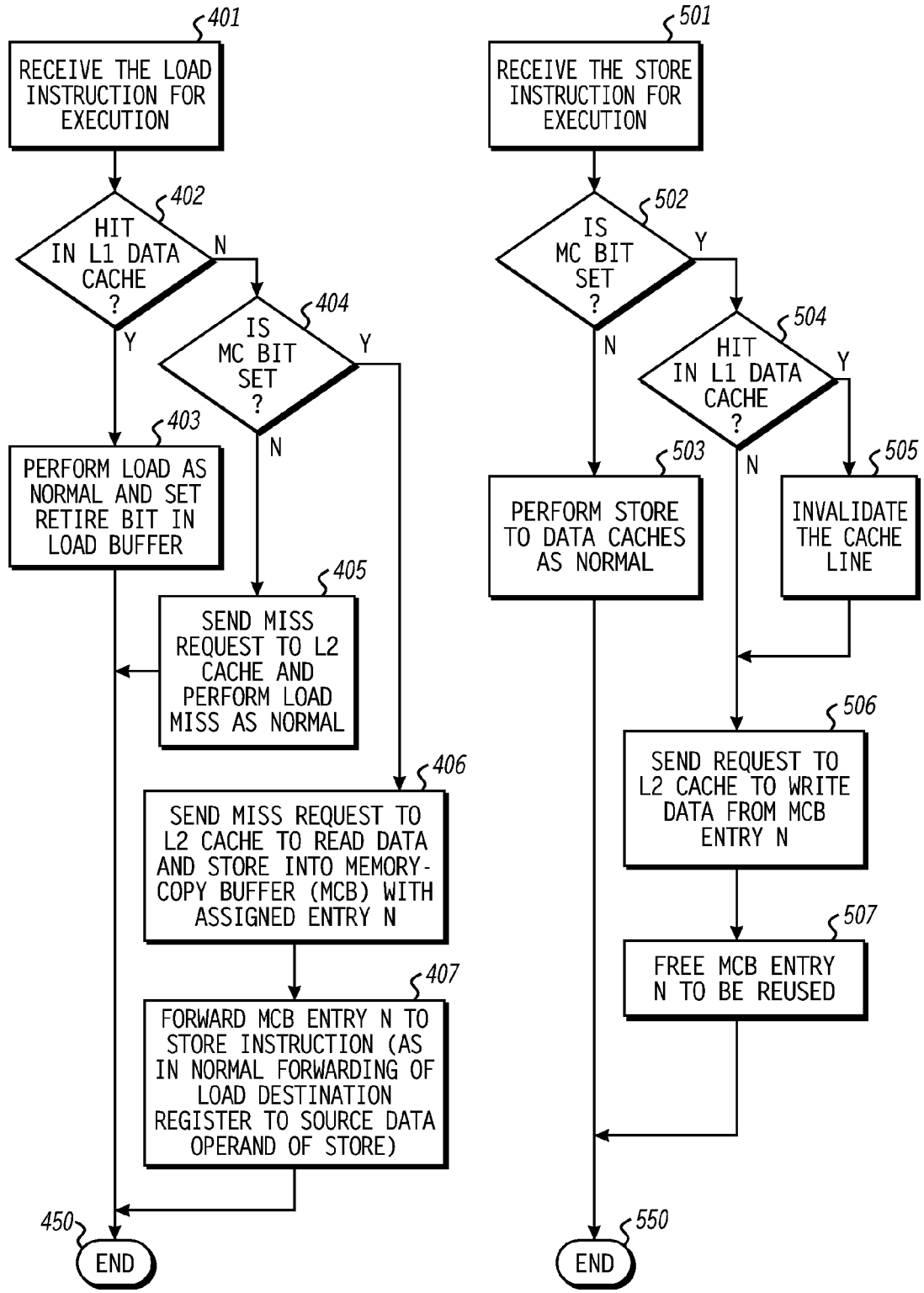
FIG. 4 is a flow diagram illustrating a method of executing a load instruction in accordance with one embodiment of the present disclosure.
FIG. 5 is a flow diagram illustrating a method of executing a store instruction in accordance with one embodiment of the present disclosure.

FIG. 4 illustrates a flow diagram of a method of executing a load instruction in accordance with one embodiment of the present disclosure. At block 401 the execution engine 108 receives the load instruction for execution. At block 402, the execution engine 108 determines if the load instruction results in a hit at the data cache 110. If so, the method flow moves to block 403 and the execution engine 108 performs the load as normal, whereby it retrieves the load data from the data cache 110 and stores the load data at the renamed destination register of the load instruction and the retire bit in load buffer 140 is set. If the load is part of the memory-copy operation, then the store instruction reads store data from the register file to store to memory. The load data can be forwarded to the store instruction as normal during dependency checking. The method flow proceeds to block 450, where the load instruction completes execution and the method ends.

If, at block 402, the execution engine 108 determines that the load instruction does not result in a hit at the data cache 110, the method flow moves to block 404 and the execution engine 108 determines whether the MC bit for the load instruction is set. If not, the load instruction is not associated with a memory copy operation. Accordingly, the method flow proceeds to block 405 and the execution engine 108 sends a miss request to the L2 cache 112. The execution engine 108 proceeds to process the load operation as normal. In particular, in response to the miss request, the L2 cache 112 will indicate whether the load data is stored at the L2 cache 112. If so, the execution engine 108 transfers the load data to the data cache 110, and also loads the load data to the destination architectural register at the register file 109. If the miss request to the L2 cache 112 results in a cache miss at the L2 cache 112, the execution engine retrieves the load data from a higher level of the memory hierarchy. The method flow proceeds to block 450, where the load instruction completes execution and the method ends.

Returning to block 404, if the MC bit is set for the load instruction, this indicates that the load instruction is associated with a memory copy operation. Accordingly, the method flow moves to block 406 and the execution engine sends a miss request to the L2 cache 112, instructing the L2 cache 112 to store the load data at the MCB 141 at an entry N, where the entry N is the next available entry in the MCB 141. The method flow proceeds to block 407, and the execution engine 108 forwards the MCB entry N to the store instruction that uses the load instruction's destination register as its source register. This store instruction is associated with the same memory copy instruction as the load instruction. Accordingly, by forwarding the entry N to the store instruction, the execution engine 108 can execute the store instruction by transferring the data from the entry N directly to its destination at the L2 cache 112, without using the registers at the register file 109. The method flow proceeds to block 450, where the load instruction completes execution and the method ends.

FIG. 5 illustrates a flow diagram of a method of executing a store instruction in accordance with one embodiment of the present disclosure. At block 501, the execution engine 108 receives the store instruction for execution. At block 502 the execution engine 108 determines whether the MC bit is set for the store instruction. If so, then the store instruction will have received forwarded entry N described above with respect to FIG. 4. If the MC bit is not set, the method flow proceeds to block 503 and the execution engine 108 performs the store instruction normally. In particular, the execution engine 108 transfers the data from the source architectural register of the store instruction to one or more locations of the memory hierarchy (e.g. an entry of one or more of the caches 110 and 112), as indicated by the store instruction. The method flow proceeds to block 550, where the store instruction completes execution and the method ends.

If, at block 502, the execution engine 108 determines that the MC bit is set for the store instruction, this indicates that the store instruction is associated with a memory copy operation. Accordingly, the method flow moves to block 504 and the execution engine 108 determines if the store instruction results in a hit at the data cache 110. If not the method flow proceeds to block 506, described below. If the store instruction results in a cache hit at the data cache 110, the execution engine 108 invalidates the cache line that resulted in the hit. The method flow proceeds to block 506, and the execution engine 108 sends a request to the L2 cache 112 to write the data at entry N of the MCB 141 to a location of the L2 cache 112 indicated by the store instruction. The method proceeds to block 507 and the execution engine 108 frees the entry N to be reused by marking the entry N as invalid.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method, comprising:
    receiving a first load instruction and a first store instruction of a memory copy operation, wherein the memory copy operation is an operation that copies a block of data from a first portion of a first cache of one or more caches to a second portion of the first cache, wherein a second cache of the one or more caches is a lower level of memory hierarchy as compared to the first cache;
    in response to determining the first load instruction is associated with the memory copy operation, determining whether first data associated with the first load instruction in the first portion of the first cache is also in the second cache;
    in response to the first data associated with the first load instruction also being in the second cache, transferring the first data associated with the first load instruction from the second cache to the second portion of the first cache;
    in response to the first data associated with the first load instruction not also being in the second cache, transferring the first data associated with the first load instruction from the first portion of the first cache to a buffer; and
    in response to determining the first store instruction is associated with the memory copy operation, transferring the first data from the buffer to the second portion of the first cache, the buffer is separate from a register file of a processor and the one or more caches.

2. The method of claim 1, wherein determining if the first store instruction is associated with the memory copy operation comprises determining if the first store instruction is associated with the memory copy operation based on the load bit associated with the destination architectural register of the first load instruction, the load bit set in response to determining the first load instruction is a load instruction.

3. The method of claim 2, wherein determining if the first load instruction is associated with the memory copy operation comprises determining if a first decoded instruction is associated with the memory copy operation based on a load bit and on a store bit, the store bit set in response to determining the first store instruction uses the destination architectural register of the first load instruction as a source register.

4. The method of claim 3, further comprising:
    determining if the first load instruction is associated with the memory copy operation based on a scoreboard that maps architectural registers to physical registers at the register file.

5. The method of claim 3, wherein transferring the first data to the buffer comprises: transferring the first data to the buffer from the first cache instead of transferring the first data to the register file via the second cache.

6. The method of claim 5, wherein determining if the first load instruction is associated with the memory copy operation comprises determining the first load instruction is not associated with the memory copy operation in response to an instruction using a destination operand of the first load instruction as a source operand.

7. The method of claim 5, further comprising confirming the first load instruction is associated with the memory copy operation in response to an instruction using a destination operand of the first load instruction as a destination operand.

8. The method of claim 3, wherein transferring the first data to the buffer comprises transferring the first data to a designated location of the buffer, and further comprising forwarding an indicator of the designated location to a store instruction.

9. The method of claim 3, wherein the first load instruction and the first store instruction are first type of store instruction, the processor able to execute instructions of the first type and of a second type.

10. A method, comprising:
receiving a first load instruction and a first store instruction of a memory copy operation, wherein the memory copy operation is an operation that copies a block of data from a first portion of a first cache of one or more caches to a second portion of the first cache;
in response to determining the load instruction is associated with the memory copy operation, transferring first data of the load instruction from the first portion of the first cache to a buffer;
determining if a first decoded instruction is associated with the memory copy operation based on a load bit and on a store bit, the load bit set in response to receiving the load instruction and the store bit set in response to determining the store instruction uses the load instruction's destination register as a source register; and
in response to determining the first store instruction is associated with the memory copy operation, transferring first data indicated by the first store instruction from a buffer to the second portion of the first cache, the buffer is separate from the one or more caches and from a register file storing a source data operand of a second store instruction.

11. The method of claim 10, further comprising:
determining if the first store instruction is associated with the memory copy operation based on a scoreboard that maps architectural registers to physical registers at the register file.

12. The method of claim 11, wherein the scoreboard indicates an execution queue for a latest instruction which uses a corresponding architectural register as a destination operand.

13. The method of claim 10, further comprising:
determining, by scoreboard and dependency logic, whether an instruction is dependent on another instruction;
recording, by scoreboard and dependency logic at the scoreboard, mapping of the architectural registers to the physical registers at the register file; and
storing information indicating whether an architectural register has been designated for use by load and store instructions associated with the memory copy operation.

14. A processor, comprising:
a register file;
one or more caches including a first cache and a second cache, wherein the second cache is a lower level of memory hierarchy as compared to the first cache;
a buffer coupled to the first cache; and
an execution engine to transfer first data from a first portion of the first cache to the buffer in response to determining that a first load instruction is associated with a memory copy operation and in response to the first data associated with the first load instruction not also being in the second cache, wherein the memory copy operation is an operation that copies a block of data from the first portion of the first cache to a second portion of the first cache, to transfer the first data associated with the first load instruction from the second cache to the second portion of the first cache in response to the first data associated with the first load instruction also being in the second cache, to transfer second data from the first cache to the register file in response to a second load instruction, and to transfer the first data indicated by a first store instruction from the buffer to the second portion of the first cache in response to determining the first store instruction is associated with a memory copy operation, the buffer is separate from the register file and the one or more caches.

15. The processor of claim 14, wherein the execution engine is to transfer the first data from the buffer to the first cache in response to determining that a store instruction is associated with the memory copy operation.

16. The processor of claim 14, further comprising:
a scoreboard that maps architectural registers to physical registers at the register file, the execution engine to determine that the first load instruction is associated with the memory copy operation based on the scoreboard.

17. The processor of claim 16, wherein the scoreboard includes a load bit for each architectural register, the execution engine to set the load bit for the first load instruction's destination architectural register in response to determining the first load instruction is a load instruction.

18. The processor of claim 17, wherein the scoreboard includes a store bit for each architectural register, the store bit set for the first load instruction's destination architectural register in response to receiving a store instruction that uses the destination architectural register of the first load instruction as a source register.

19. The processor of claim 14, wherein in response to determining that the first load instruction is associated with the memory copy operation, the execution engine transfers the first data from the first portion of the first cache to the buffer instead of the first data being transferred to the register file or a second cache.

20. The processor of claim 16, further comprising:
scoreboard and dependency logic to determine whether an instruction is dependent on another instruction, to record, at the scoreboard, mapping of the architectural registers to the physical registers at the register file, and to store information indicating whether an architectural register has been designated for use by load and store instructions associated with the memory copy operation.

* * * * *